United States Patent [19]

Verbeeck

[11] Patent Number: 4,644,684
[45] Date of Patent: Feb. 24, 1987

[54] WOVEN SCREEN MATERIAL AND METHOD OF MAKING

[75] Inventor: Pierre Verbeeck, Zele, Belgium
[73] Assignee: Phormium N.V., Belgium
[21] Appl. No.: 739,758
[22] Filed: May 30, 1985

Related U.S. Application Data

[63] Continuation of Ser. No. 466,119, Feb. 14, 1983, abandoned.

[30] Foreign Application Priority Data

Mar. 19, 1982 [BE] Belgium .............................. 0207.617

[51] Int. Cl.$^4$ ............................................. A01G 13/00
[52] U.S. Cl. ...................................................... 47/31
[58] Field of Search .................... 47/31, 26, 28, 20; 52/3; 428/350, 460

[56] References Cited

U.S. PATENT DOCUMENTS

| | | | |
|---|---|---|---|
| 2,601,326 | 6/1952 | Rohs et al. | 47/31 |
| 3,152,950 | 10/1964 | Palmquist et al. | 428/460 |
| 3,741,631 | 6/1973 | Laing | 47/17 |
| 4,027,437 | 6/1977 | Monsky et al. | 47/28.1 A |
| 4,283,888 | 8/1981 | Cros | 52/3 |

Primary Examiner—Robert A. Hafer
Assistant Examiner—Bradley M. Lewis
Attorney, Agent, or Firm—McCormick, Paulding & Huber

[57] ABSTRACT

This invention relates to the production of a shading and insulating screen for greenhouses or a protection screen in the open air for market gardening cultivation or horticulture, having a regular check pattern, using a circular loom comprising an insertion device (7) which is provided with a compensator (12).

The screens which are obtained have a homogeneous air-permeability which allows the bed to respire uniformly, but they are impermeable to water. They have an increased firmness. The method allows the production of screens made of metallized polyester film capable of filtering the sun's rays.

2 Claims, 4 Drawing Figures

WOVEN SCREEN MATERIAL AND METHOD OF MAKING

This is a continuation of co-pending application Ser. No. 466,119 now abandoned filed on 2/14/83.

BACKGROUND OF THE INVENTION

The present invention relates to a shading and insulating screen for greenhouses or a protection screen in the open air, formed from a chequerwork comprising a series of thin narrow strips which are interlaced and are made of synthetic material.

This invention mainly applies to screens which are used in market gardening cultivation and in horticulture to protect vegetables and/or flowers grown in greenhouses or in the open air from light and from the cold.

The present invention also relates to a method of producing a screen as described above, using a series of thin strips forming warp and weft elements which are intercrossed and/or interlaced.

PRIOR ART

A method is known for the production of a shading and insulating screen for greenhouses which proceeds from narrow strips made of synthetic material. A conventional, automatic, rectilinear loom is used in this method.

In rectilinear looms, the warp threads are wound in a cylindrical shape onto the beam, and they unwind parallel with respect to each other by unravelling perpendicularly to the winding axis. They then pass onto separation laths, then into the eyelets of heddles which are mounted on heddle-supporting frames and are to separate the warp elements into two layers between which slides at least one shuttle.

In conventional rectilinear looms, the weft positioned in the above-mentioned shuttle is unwound longitudinally, i.e. along the winding axis of the thread on the shuttle. The longitudinal unwinding allows the narrow strip to be unravelled at very irregular speeds which are inherent in the repeated backwards and forwards motion of the shuttle provided with the weft. The weft thread does not perform any rotational movement with respect to the winding axis of the strip. It is only the shuttle which moves. In weaving using a twisted thread, longitudinal unwinding does not present any disadvantages. On the other hand, if weaving is carried out using a flat strip, longitudinal unwinding causes twisting at each turn. This entails visible irregularities in the cloth forming the above-mentioned screen.

Thus, a rectilinear loom does not allow the production of screens having a regular check pattern. In fact, the narrow strips forming the warp elements and the weft elements thereby inevitably undergo folding and twisting operations in the longitudinal direction which are due to the very constructional characteristics of rectilinear looms, the only looms to be used hitherto for the production of the above-mentioned screens.

German patent application DE-No. A 2,615,046 discloses a loom which is particularly intended for the production of a canvas or woven screen, comprising a shuttle in which the cop is positioned so that unwinding is carried out in a direction perpendicular to the winding axis of the weft. Thus, twists in the weft strip are avoided. However, the machine which has been described is incapable of being used for weaving a shading screen without considerably modifying the device for distributing the warp strip and the devices which ensure an equal tension of the warp and weft strips.

Circular looms are also known which are mainly used for weaving large container bags made of jute or thick synthetic fibres. A fairly wide strip is sometimes used in these known machines as the warp or weft element. However, these strips have a considerable thickness in order to provide the resistance to the traction which is required.

In these known circular looms, the warp threads are, however, always juxtaposed on the heddles in order to obtain a partial covering of the warp threads one on top of another, to obtain a very tight package. The effect of this covering and the alternation in the tensions on the warp elements is also to cause some strips to fold over their complete length. Of course, these folds in the warp strips also cause visible irregularities in the cloth forming the above-mentioned screen.

BRIEF DESCRIPTION OF THE INVENTION

It is an object or the present invention to suppress the irregularities in known shading screens. The invention relates to a shading and insulating screen for greenhouses, or to a protection screen in the open air, formed from a chequerwork comprising a series of thin strips which are interlaced and are made of synthetic material, essentially characterised in that it has between adjacent edges of thin strips which are juxtaposed in pairs without overlapping, interstices which are permeable to air, but are impermeable to water and are distributed in a uniform manner over the complete surface of the screen.

The present invention also relates to a method of producing a shading and insulating screen for greenhouses or a protection screen in the open air, using a series of thin strips forming warp and weft elements which are intercrossed and interlaced, this method being essentially characterised in that a circular loom is used in which warp strips are arranged adjacent to each other, without overlapping, to obtain a uniform permeability and a perfect regularity of the screen.

According to one characteristic of the present invention, the warp strips are arranged so that they cover 96% of the screen in width and the advance of the weft is controlled so that the weft strips cover 96% of the screen in the longitudinal direction to obtain an air-permeability of the screen which is equal to 0.16%.

According to another characteristic of the present invention, the above-mentioned cylindrical cloth is cut by ultrasound along one warp strip to obtain a rectangular screen.

DETAILED DESCRIPTION OF THE INVENTION

Other characteristics and details will be revealed from the description of the accompanying drawings which schematically illustrate in a nonlimiting manner one embodiment of shading screens having a regular weft which are produced by the method of the present invention.

Figure 4:
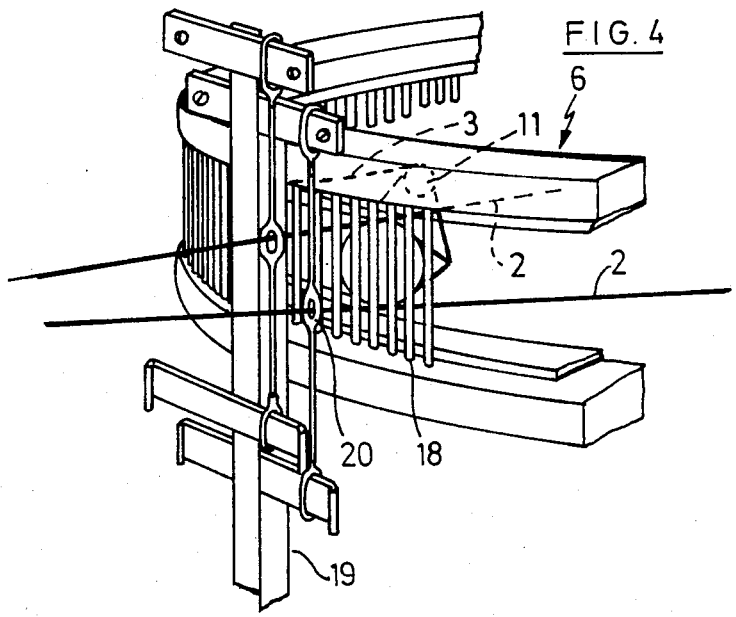

FIG. 4 schematically illustrates a circular loom, into which the warp strip is guided and positioned flat.

The same reference numerals in these different Figures designate identical or analogous elements.

Figure 1:
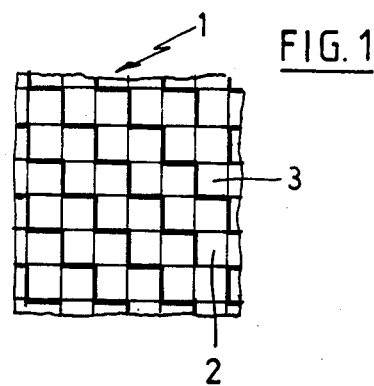
FIG. 1 is a plan view of a screen produced on a circular loom.

As shown in FIG. 1, the shading and insulating screen according to the present invention comprises a chequerwork which is designated as a whole by reference numeral 1. The chequerwork comprises a series of narrow parallel strips made of flexible synthetic material and the strips may be translucent, semi-opaque or opaque, or they may filter or reflect the rays of the sun. These strips form the warp elements 2. The chequerwork also comprises a series of narrow strips made of the same material which intercross by a backwards and forwards motion with the series of warp elements mentioned above, perpendicularly to this series and they form the weft elements 3.

The chequerwork 1 described above has a perfect regularity which is greatly valued by horticulturists.

Shading and insulating screens which are used in greenhouses to protect plants in market gardening cultivation and in horticulture against the rays of the sun and against the cold must comply with very strict standards of regularity, homogeneity, permeability and strength if an equal growth of all the plants in the greenhouse is to be ensured. This is indispensible in ensuring a simultaneous flowering of all the plants on one predetermined day: 1st May, All Saints' day, etc..

The production of a screen of this type which is superior in quality to all presently existing screens is associated with the production of a fabric in which all the narrow strips positioned in the direction of the warp remain uniformly flat. The same condition must be met by the thin strips positioned in the direction of the weft.

The chequerwork 1 thus formed has a uniform permeability to air which allows the respiration of the plants over the complete surface covered by the screen. It ensures a stable temperature with a minimum tolerance as much upwards as downwards.

It allows the thermostats of the greenhouse heating to be adjusted to a lower temperature. It allows the variation in temperature between the layers of air above the screen and those below the screen to be controlled and thus makes it possible to save energy.

Figure 2:
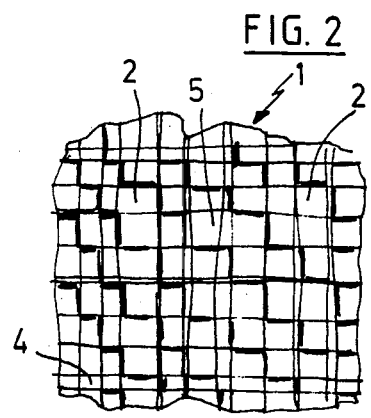
FIG. 2 is a similar view of a screen made on an automatic rectilinear loom.

A summary visual examination of a screen produced on an automatic rectilinear loom shows the defects which are due to folding 4 in the longitudinal direction of the strips forming the warp elements 2, and the defects due to the torsion 5 also in the longitudinal direction of the strips forming the weft elements 3 (FIG. 2).

Irregularities in the screen also cause water vapour to condense in colder zones. Such condensation is to be avoided, because the fall of water droplets may damage young plants and leave indelible stains on the leaves.

Thus, this shows the importance of overcoming the disadvantages of known methods of producing shading screens.

Figure 3:
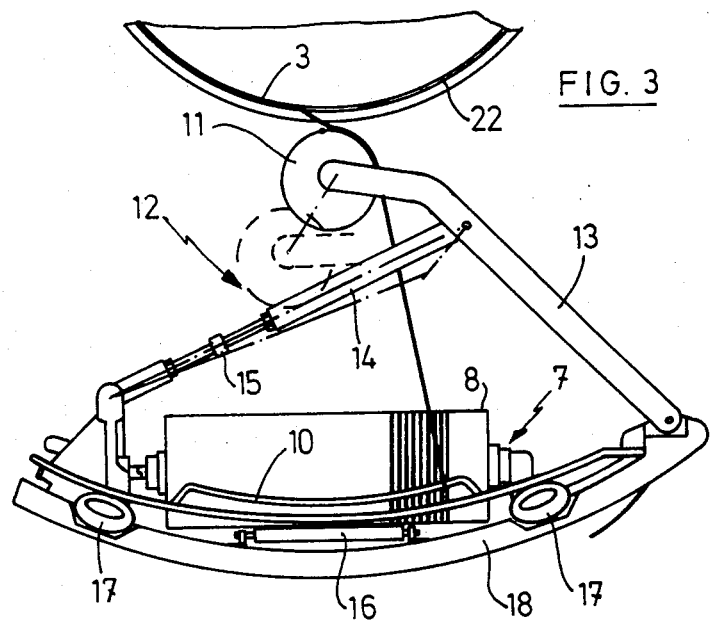
FIG. 3 is a plan view of an insertion device provided with a compensator.

As shown in FIGS. 3 and 4, a circular loom is used for the production of the above-mentioned screens 1, which loom is designated as a whole by reference numeral 6 and is provided with thin strips 2, about 2.4 mm in width, forming the warp elements, and horizontal strips 3 forming the weft elements. The warp elements 2 are wound on bobbins which are not shown in FIG. 3 and are possibly arranged around the loom. The weft elements are wound onto cops 8, each of which supplies a device 7 for the insertion of a weft strip 3 between the above-mentioned warp elements 2 separated into two layers.

In order to obtain a homogeneous porosity and a perfect regularity of the screen, the weft strips are carefully arranged so that they lie flat, adjacent to each other so that they do not overlap. They are brought into their final position 9 and guided by guides 10 and a roller 11 so as not to undergo a folding action, and their tension is controlled individually by means of compensators 12. These compensators each comprise a small lever 13 supporting the roller 11 and being activated by a spring 14, the tension of which may be adjusted by a screw 15. The unwinding of the cop 8 from the insertion device 7 is controlled and braked by a circular brush 16. The insertion device 7 is supported by rollers on a reed 18.

The regular arrangement of the warp threads is obtained using a reed 18 or a comb positioned along the heddles 19 at the height of the eyelets 20 of the loom, and between the teeth 21 of which are positioned one or more warp threads 2. The reed 18 thus ensures a constant spacing between the warp threads 2, and a ring 22 is used to fix the diameter of the fabric on the circular loom 6 (FIG. 4).

By uniformly, distributing the warp threads 2 in an effectively flat manner while providing a small interstice, it is possible to produce screens which have a well determined permeability. This permeability or porosity confers to the screen particular properties which could be the object of new applications. The screen allows a regular and uniform ventilation of the greenhouses, while an air exchange is allowed between the layers of air on both sides of the screen. Certain permeability values of the screen allow the selective passage of a restricted quantity of air and prevent the infiltration of water.

The production of a semi-permeable screen of this type i.e., a screen which is permeable to air but impermeable to water is illustrated by the following Examples.

EXAMPLE 1

A screen having a permeability of about 0.16% is produced in the following manner: 400 warp strips 2.4 mm wide, per metre of cloth are arranged in an effectively flat manner around the circular loom, and the advance of the cloth is controlled by also introducing 400 strips as the weft element, per linear metre of cloth. In this manner, 96% of the screen is covered in width by the warp strips, and 96% of the screen is covered in the longitudinal direction by the weft strips. The permeability of the screen results from the interstices forming a free space between the adjacent edges of the warp strips and the weft strips in juxtaposition. The permeability may be determined by an elementary calculation:

$$P = (0.04)^2 = 0.16\%$$

This permeability of the screen allows the plants to respire, while it ensures an air exchange between the layer of air confined in the greenhouse under the shading screen and the layer of air above the screen. These two layers of air usually have different hygrometric conditions.

For the cultivation of tropical plants in local regions, care is taken, for example in ensuring optimum humidity and temperature conditions in the greenhouse by heating the greenhouse in winter to a temperature approaching 22° C.

For a temperature of 22.9° C. and for a relative humidity of 75%, the ambient atmosphere in the greenhouse will have an absolute humidity or a water content of 13.5 g of water/kg of dry air. The top layer of air between the screen and the external walls of the greenhouse may be colder; only reaching 10° C. In view of the exchange of air between the bottom layer and the top layer, the latter is continuously concentrated with water vapour. For example, at a temperature of 10.5° C. the air is saturated with water vapour when it contains 6.6 g of water/kg of dry air.

The top layer is generally saturated with water vapour and the least subsequent cooling or subsequent concentration of water vapour causes some of the vapour to condense, either in the form of a mist, or in the form of a liquid deposition of water on the cold walls of the greenhouse. The cold walls are generally the walls which are in contact with the colder external medium.

Drops of condensation are formed which are deposited on the greenhouse walls. By running down these walls, the droplets are likely to fall on the shading screen. Due to the water-impermeability of the screen, these droplets do not reach the leaves, because they form on the screen a sheet of water which will eventually flow away along this screen.

When the shading screen has a uniform permeability over its complete surface, it in fact ensures a uniform distribution of the hygrometric degree in the top layer. The absence of air zones which are locally supersaturated with water makes it possible to slightly lower the temperature of the complete greenhouse and thus to obtain a saving in fuel for heating purposes.

EXAMPLE 2

The screen according to the present invention has a new application in market gardening cultivation and in horticulture, as a shading screen in the open air in temperate and tropical zones.

In some hot countries, there may be vast differences between the day time temperature and the night time temperature, differences of about 30° to 40° C. within 12 hours.

The relative humidity must be maintained at 75% to ensure optimum growth conditions for the plants. Such a hygrometric condition may only be obtained in dry countries by restricting the exchange of air between the layer of air confined below the shading screen and the ambient atmosphere in an arid climate.

By making a judicious choice of the framework, the method which has been described allows the production of a cloth, which, due to its regularity and to its density, has a homogeneous and well determined air-permeability which will be selected as a function of the climatic conditions and the restraints characteristic of each culture.

This homogeneous permeability in fact makes it possible to adjust and optimise the indispensible ventilation of the plants and to thus restrict the consumption of water.

In view of the fact that, in contrast to shading screens known hitherto, the narrow strips are in an effectively flat arrangement, they provide the screen according to the present invention with a flexibility, a lightness and a regularity unrivalled to this day. In effect, this screen has over its complete surface a double thickness due to the superposition at each point of the screen of a warp strip and a weft strip, whereas in the screens known hitherto, the cloth has a triple, or even a quadruple thickness in many places, since each of the warp strips or weft strips may be folded back on itself in the longitudinal direction.

Thus, it is evident that a cloth according to the present invention, even when it is folded back on itself to clear the greenhouse, is not as cumbersome as known screens.

However, for certain uses, it may be of advantage to fold the cylindrical cloth back on itself to produce a double screen, preferably made of opaque synthetic material. The edges of the cloths forming the above-mentioned double screen are then advantageously soldered.

It is possible to produce the above-mentioned screen from narrow strips of transparent synthetic material or of synthetic material which filters the ultra-violet rays of the sun, or reflects the sun's rays, for example using a film of metallised transparent synthetic material, in particular a metallised polyester film.

Strips of transparent synthetic material are then arranged in the direction of the warp elements, and strips of synthetic material which reflect or filter the sun's rays are arranged in the direction of the weft elements, possibly being regularly alternated with strips of transparent synthetic material. The density of the metallised strips reflecting the sun's rays will make it possible to regulate or to proportion the light intensity in the greenhouse. It is also possible to arrange strips of transparent synthetic material in the direction of the weft elements, and strips of synthetic material which reflect or filter the sun's rays in the direction of the warp elements, possibly regularly alternating with strips of transparent synthetic material.

In spite of the fragility of this metallised polyester film which tears very easily, an extremely firm and durable screen is obtained by the method according to the present invention.

It is clear that this invention is not restricted to the details described above, and that other modifications may be made to these details without exceeding the scope of the invention.

I claim:

1. A shading and insulating screen for greenhouses and especially suited for use in the open air, comprising a flat sheet of air permeable but water impermeable warp and weft elements, each of such elements comprising a flat rectangular shaped monofilament air impermeable strip of synthetic material which is quite thin in relationship to its width, at least some of said thin strips being made of transparent synthetic material, and other of said strips being made of a synthetic material adapted to reflect solar rays, said warp and weft elements interlaced with respect to one another to provide a checquer configuration, said strips having a width of at least 2.4 mm and wherein the strips are so spaced relative to one another that the resulting permeability is at least approximately 0.16 percent so as to achieve the limited transfer of air from one side of the screen to the other but to inhibit the transfer of water therebetween.

2. A screen according to claim 1 wherein all warp elements are fabricated from one of the two materials mentioned in the preceding claim and all of the weft elements are fabricated from the other of such syhnthetic materials.

* * * * *